United States Patent [19]

McLeod

[11] Patent Number: 4,565,003
[45] Date of Patent: Jan. 21, 1986

[54] PIPE ALIGNMENT APPARATUS

[75] Inventor: Malcolm L. McLeod, Stavanger, Norway

[73] Assignee: Phillips Petroleum Company, Bartlesville, Okla.

[21] Appl. No.: 569,813

[22] Filed: Jan. 11, 1984

[51] Int. Cl.⁴ .............................................. B23K 37/04
[52] U.S. Cl. .................................... 29/281.1; 269/43; 228/49.3
[58] Field of Search ................. 29/272, 281.1; 269/43; 228/49 B

[56] References Cited

U.S. PATENT DOCUMENTS

| | | | |
|---|---|---|---|
| 1,482,162 | 1/1924 | Streda | 29/272 |
| 2,758,654 | 8/1956 | Simmons. | |
| 3,013,925 | 12/1961 | Larsen. | |
| 3,414,950 | 12/1968 | Phariss | 269/43 X |
| 3,920,232 | 11/1975 | Clark | 269/43 X |
| 4,295,527 | 10/1981 | Rüsse. | |
| 4,318,547 | 3/1982 | Ericson. | |
| 4,356,615 | 11/1982 | Dearman | 269/43 X |

Primary Examiner—Frederick R. Schmidt
Assistant Examiner—Steven P. Schad
Attorney, Agent, or Firm—C. F. Steininger

[57] ABSTRACT

Apparatus for aligning two sections of pipe, including a cage means made up of two half sections hinged together on one side and having closure means to close the opposite sides, a first end of the cage is adapted to bear against and grip one of the two sections of pipe, preferably through arcuate shoes, when the cage is closed and at least three independently operable pistons are spaced about the other end of the cage and are adapted to bear against and laterally move the other of the two sections of pipe, preferably through arcuate shoes on the ends of the piston rods, when the cage is closed and the pistons are activated. The ends of the cage are preferably spaced from one another to provide access to the area where the sections of pipe are being aligned and preferably a second set of pistons is longitudinally spaced from and aligned with the first set and a common shoe is mounted on each pair of longitudinally spaced piston rods.

19 Claims, 3 Drawing Figures

PIPE ALIGNMENT APPARATUS

The present invention relates to apparatus for aligning the ends of two sections of pipe which are to be joined. In a more specific aspect, the present invention relates to apparatus for aligning the ends of two sections of pipe, particularly large diameter pipe.

BACKGROUND OF THE INVENTION

The joinder of sections of pipe, particularly joining a new movable section to a relatively immobile section can be required in practically any position. However, in most instances, the sections to be joined are in a horizontal position, as in building a pipeline, or in a vertical position, as in running a drill string, tubing or casing in a well. When the pipe to be joined, whether the joint be welded, screw-type or glued and whether the pipe be metallic or plastic, the alignment and holding of the pipe during joinder is a relatively simple task when the pipe diameter is relatively small. In most instances a new section of pipe is moved into place, aligned and held by hand during joining. When the section of the pipe to be joined to the relatively fixed section is too heavy or inconvenient to handle manually, a chain is generally wrapped around the movable section of pipe and a crane with a dragline is used to carry the pipe to location. However, again, the end of the movable section of pipe is guided into place and held in place for joinder by hand. More sophisticated techniques utilize tongs, jaws or clamps of some type, either manually actuated or mechanically actuated, to grip the free section of pipe and permit it to be aligned by hand for joinder. Still more sophisticated devices involve an elongated, rigid structure having a clamping means or jaws at each end thereof, manually or mechanically actuated, one of which grips the end of the relatively fixed section of pipe and the other of which grips the end of the free section of pipe. Such devices can be utilized where the pipe section is to be joined are vertically oriented or horizontally oriented and can be made more sophisticated by making the means gripping the free section of pipe movable in a longitudinal direction to bring the free section of pipe into contact with the relatively fixed section. In the use of such devices, it is assumed that since the two clamping or gripping devices are mounted on a common support structure and are longitudinally aligned, two sections of pipe clamped in such a device will necessarily have their ends aligned. While this may be true where the freely movable section of pipe is short, light and/or of small diameter, it is not necessarily the case where the pipe is extremely heavy, long and/or of relatively large diameter, particularly large diameter. All of the problems of aligning and holding pipe in place for joinder, whether of large or small diameter and irrespective of the type of pipe or the type of joinder involved, are multiplied many fold where the joinder of the pipe is carried out in offshore locations, as in the building of pipelines or the replacement or construction of exhaust stacks on floating platforms or other types of offshore structures.

SUMMARY OF THE INVENTION

It is therefore an object of the present invention to provide an improved apparatus for aligning and holding sections of pipe which overcomes the above-mentioned and other problems of the prior art. Another and further object of the present invention is to provide an improved apparatus for aligning and holding sections of pipe to be joined. A still further object of the present invention is to provide an improved apparatus for aligning and holding sections of large diameter pipe, whether of metallic or plastic materials. Another object of the present invention is to provide an improved apparatus for aligning pipe, particularly useful in aligning a pipe in a vertical position. A further object of the present invention is to provide an improved apparatus for aligning a freely movable section of pipe with a relatively fixed section of pipe. Still another object of the present invention is to provide an improved apparatus for aligning a freely movable section of pipe with a relatively fixed section of pipe in which the end of the movable section of pipe can be laterally moved in any direction or by any amount. Yet another object of the present invention is to provide an improved apparatus for aligning a relatively movable section of pipe with a relatively fixed section of pipe in which the top or bottom of the movable section of pipe may be moved laterally in any direction independently of the movement of the other portion. These and other objects and advantages of the present invention will be apparent from the following description.

DESCRIPTION OF THE PREFERRED EMBODIMENTS

Figure 1:
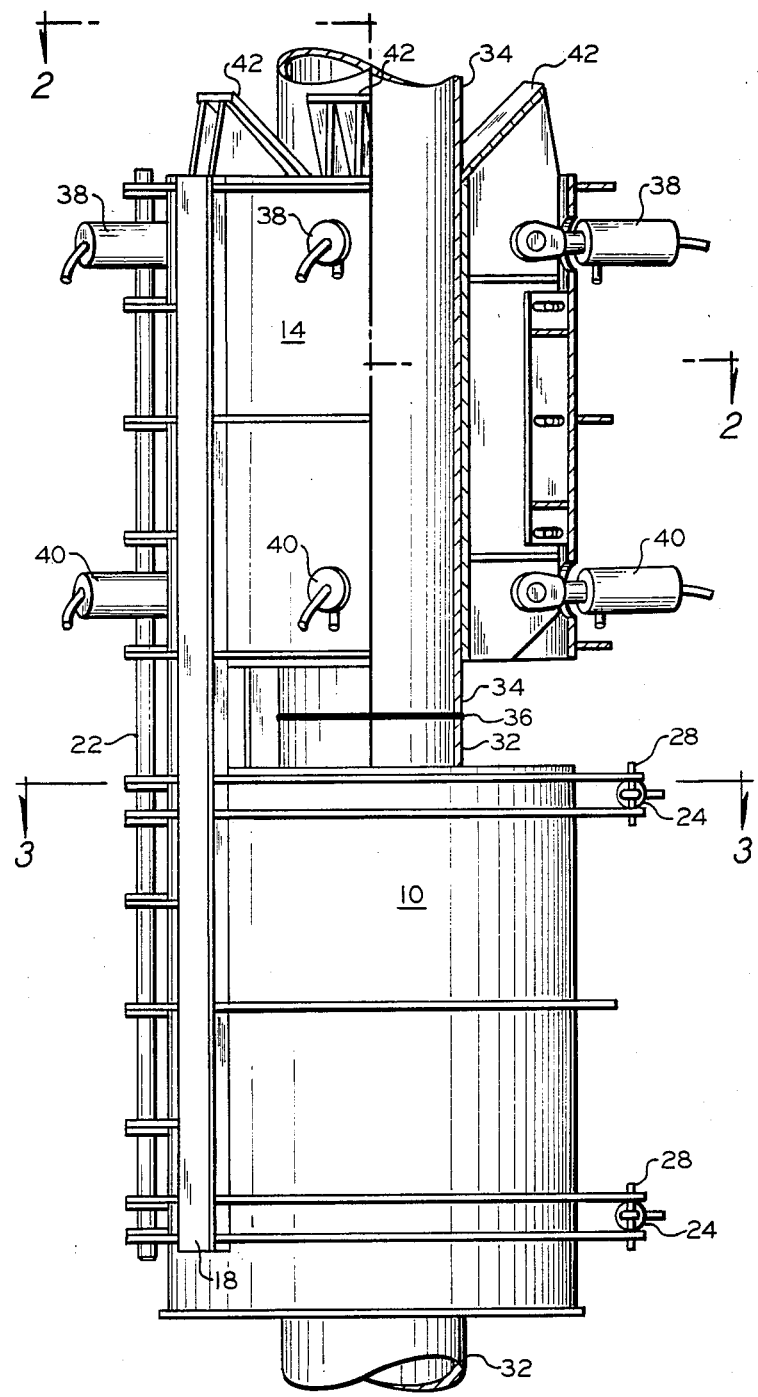
FIG. 1 of the drawings is a side view, partially in section of a pipe aligning apparatus in accordance with the present invention.
Figure 2:
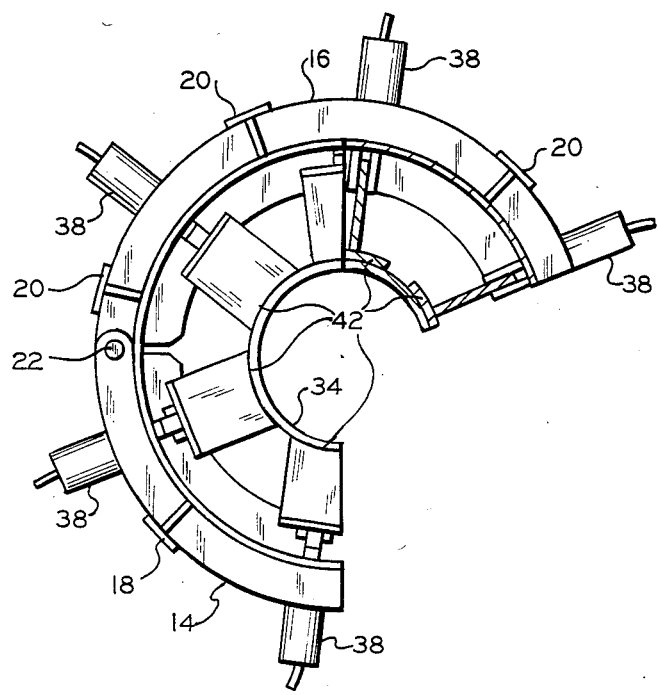
FIG. 2 is a cross-sectional view taken along the line 2—2 of FIG. 1.
Figure 3:
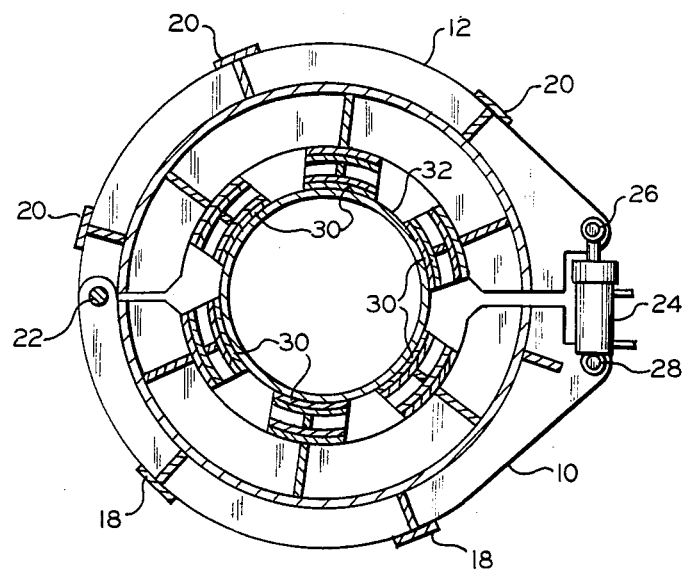
FIG. 3 is a cross-sectional view taken along the line 3—3 of FIG. 1.

As previously indicated, the apparatus of the present invention may be utilized for the alignment and holding of any type of pipe, whether metallic or plastic, which are to be joined in any manner, whether by butt or other type of welding, screw joints, slip joints to be glued or welded, etc., or any orientation whether horizontal, vertical, etc. or any length or diameter of pipe. However, the apparatus of the present invention will hereinafter be described in a form which has been successfully utilized to butt weld a new section of metallic pipe having a 24-inch diameter to a vertical flare stack on an offshore oil production platform.

Referring to the drawings, an elongated cage is made up of two generally semi-circular half sections, including lower sections 10 and 12 and upper sections 14 and 16, respectively. Lower and upper half sections 10,14 and 12,16 are rigidly joined by vertically disposed T-beams 18 and 20, respectively. The two semicircular half sections of the cage are joined on one side by a common hinge pin 22 and the opposite sides are coupled together through coupling or closure means, such as one or more hydraulic or electrically operated pistons 24. Pistons 24 may be fixedly mounted and the cage means enlarged or reduced in size simply by operating the piston means or, preferably, either or both of pins 26 and 28 holding the rod and cylinder, respectively, of piston 24 may be detachable coupling means. Mounted within lower half sections 10 and 12 of the cage are a plurality of shoes 30. While two such shoes could be utilized for obvious reasons of stability, orientation and gripping of a lower pipe section 32, at least three such shoes should be employed. Also while the shoes 30 may be flat, they are preferably arcuate so as to generally conform to the curvature of the pipe section 32. In the use of the aligning device of the present invention, the open area inside the device may be enlarged or reduced in size simply by operating piston means 24 between fully extended and fully contracted positions. Thus, the cage device may be enlarged to slide the same over pipe section 32 and then reduced in size so as to grip pipe section 32 by means of shoes 30. Such enlargement and reduction in size of the cage by means of piston means 24 also permits the utilization of the device on pipes of different diameters. For example, the structure shown in the drawings of the present invention is capable of use on pipes varying in diameter by as much as 14 inches, for example, between about 28 inches and 42 inches in diameter. Where the shoes 30 are arcuate as shown, and are made up of long, large segments of a circle, it may be desirable to pivotally mount shoes 30 to pivot on vertical axis, thus better gripping, particularly of the small diameter pipe, can be effected. It is also possible where still further variation in the size of the pipe to be gripped is desired, to mount shoes 30 on the ends of appropriate pistons. For example, if the pistons had a 6-inch stroke, this would add another 12 inches to the variation in diameter which could be accommodated.

It is to be observed that lower half sections 10 and 12 are spaced from upper half sections 14 and 16 for observation during alignment of the ends of lower pipe section 32 and the end of upper pipe section 34 to be joined thereto and to permit performance of the joining operation as by welding, at weld line 36.

Mounted on upper half sections 14 and 16 of the cage are a plurality of upper piston means 38 and a plurality of lower piston means 40. Piston means 38 are generally equally spaced about the circumference of the cage at an uppermost longitudinal position while piston means 40 are vertically aligned with the corresponding upper piston means 38 by spacing the same in the same manner and locations about the circumference of the cage at a lower longitudinal position. Mounted on the free ends of the rods of piston means 38 and 40 are a plurality of gripping or support shoes 42. Support shoes 42 are generally similar in configuration and structured to shoes 30 of the bottom section. However, shoes 42 differ from shoes 30 in the manner of mounting, namely, by mounting the same on the ends of the piston rods of pistons 38 and 40, by so mounting the shoes 42 so that both the upper and lower ends pivot on a horizontal axis and by also movably mounting shoes 42 on the inside of the cage, so that the shoes not only can be moved inwardly and outwardly laterally but the bottom and top, respectively, may be moved different distance to thus tilt or rotate the shoes about a horizontal axis. This is accomplished by having each of piston means 38 and each of piston means 40 independently operable. For example, by actuating appropriate ones of the pistons 38, the top of the pipe section 34 may be tilted independently of the bottom and by operating selective pistons 40, the bottom of the pipe section 34 may be moved laterally independent of the top section. Similarly, by actuating selected pairs of pistons 38 and 40 connected to a single shoe 42, the pipe section 34 may be moved laterally and perpendicular to its axis. As previously indicated, piston means 38 and 40 are all independently operable and are preferably double acting. For example, in the apparatus built and utilized for the alignment of a 28-inch diameter flare stack, the piston means were 4-inch, double acting cylinders, the piston rods had a 6-inch stroke and the cylinders were supplied with hydraulic fluid at 300 psi. Obviously, the pistons can be electrically rather than hydraulically operated. In any event, the pistons can be operated from a suitable control panel mounted in a position such that the operator can view the alignment of the two ends of the two sections of pipe while operating the console. In actual practice, a platform was attached to the outside of the lower section and the control panel mounted so that the operator and welders could conveniently perform the functions of aligning and welding the pipe sections. While a minimum of two shoes and four cylinders could be utilized, for purposes of adequate support and manipulation, at least three shoes and six pistons should be utilized. In the present instance, six shoes and twelve pistons were utilized and permitted the operator to quickly and accurately align an upper section of pipe 34 with a lower section 32 and make each movement by small or incremental distances.

It is obvious that numerous modifications of the structure can be made without departing from the basic invention. For example, the elongated shoes 30 and 42, respectively, could be replaced by individual upper and lower shoes. However, from the standpoint of stability and gripping of the sections of pipe, the elongated shoes are preferred. It is also quite possible to modify the device so that lower sections 10 and 12 are not rigidly tied to upper sections 14 and 16. Thus, the upper section and lower section may be independently opened and closed and accordingly each could have its own individual closure means such as the cylinders 24. Such independent mounting of the upper and lower sections of the cage would also permit one to modify the apparatus so as to be able to move one section relative to the other. For example, if the upper section were independent of the lower section, the upper section could be moved longitudinally toward and away from the lower section simply by mounting an appropriate piston means adapted to slide the upper section along the hinge pin 22. Accordingly, the apparatus so modified can bring the two sections of pipe into exact longitudinal position and also into exact lateral alignment. Such longitudinal movement could also permit movement of one section of pipe into a sleeve in another section of pipe. Without modification, it also is obvious that the device could be utilized in joining threaded pipe simply by releasing the pressure on the shoes 42 slightly while still permitting guidance of pipe section 34 and then turning section 34 of pipe by appropriate means so as to threadedly mount it in the section of pipe 32.

While the previous description at least implies that the device is useful for adding a section of pipe to a fixed, vertically-disposed section of pipe, it is obvious that the apparatus is not so limited in use. Vertically disposed upper and lower sections of pipe may be both movable rather than having one section fixed. In addition, the device may be utilized in the horizontal orientation. For example, by means of a hook on the side, the apparatus could be slid over a fixed section of horizontal pipe and then be utilized to align therewith a movable section of pipe by utilizing an appropriate crane with a drag line. The device could also be utilized in a horizontal position for joining sections of large diameter pipe line by simply placing a stand on one side to support the same, placing one section of pipe in the fixedly mounted end and clamping the same, placing the second second section of pipe through the adjustable end of the cage and joining the two or the section of pipe on which the device is to be clamped could be a horizontally disposed, fixedly-mounted section and the support base for the cage could be mounted on wheels or slid over the stationary section of pipe by means of an appropriate crane with drag line or any other means and then a movable section of pipe aligned with and attached thereto through the adjustable section of the apparatus.

While specific structures and modes of operation have been recited above, it is to be understood that these specific recitals are by way of illustration only and to set forth the best mode in accordance with the present invention and, therefore, they are not to be considered limiting and various modifications and substitutions would be obvious to one skilled in the art without departing from the present invention.

That which is claimed:

1. Apparatus for aligning two separate sections of pipe comprising:
    (a) elongated cage means comprising, a pair of generally semi-circular sections hinged together on one side thereof;
    (b) at least one closure means on the opposite side of said semi-circular sections, having a complementary portion thereof mounted on each of said semi-circular sections, adapted to latch said semi-circular sections together;
    (c) a first half of said cage means being adapted to rigidly clamp said cage means about a first of said two sections of pipe when said cage means is closed and latched;
    (d) at least three pairs of piston means mounted on a second half of said cage means, the piston means of each of said pairs of piston means being spaced from one another on a line parallel to the axis of said second half of said cage means, each pair of said pairs of said piston means being mounted at spaced points about said second half of said cage means, all of said piston means of said pairs of piston means having operable piston rods extending radially into the interior of said second half of said cage means and all of said piston means of said pairs of piston means being independently operable; and
    (e) at least three elongated shoe means, longitudinally coupled to said cage means at spaced points about the interior of said second half of said cage means, each of said shoe means also being coupled to the free ends of said piston rods of a pair of said piston means and said coupling of said shoe means to said cage means and said piston rods being adapted to tilt the axis of said shoe means relative to the axis of said second half of said cage means and move said shoe means radially toward and away from the axis of said cage means when at least one of said pair of piston means is operated;
    (f) said shoe means being adapted to bear against the second section of said sections of pipe when said cage means is closed and latched.

2. Apparatus in accordance with claim 1 wherein closure piston means is mounted on one of the complementary portions of the closure means and is adapted to expand and contract the cage means when said cage means is closed and latched and said closure piston means is operated.

3. Apparatus in accordance with claim 2 wherein the closure piston means is a double-acting piston means.

4. Apparatus in accordance with claim 1 wherein the piston means mounted on the second half of the cage means are double-acting piston means.

5. Apparatus in accordance with claim 1 wherein the first and second halves of the cage means are longitudinally spaced from one another to provide an open area therebetween for access to the area where the ends of the two sections of pipe are to be aligned.

6. Apparatus in accordance with claim 1 wherein the shoe means are generally arcuate, to generally conform to the curvature of the second section of pipe.

7. Apparatus in accordance with claim 1 wherein the shoe means are pivotally coupled to the free ends of the piston rods of a pair of the piston means to pivot on an axis transverse to the axis of said shoe means.

8. Apparatus in accordance with claim 1 wherein the shoe means are coupled to the cage means in a manner to move radially toward and away from the axis of said cage means at at least two points, two of said points being adjacent the ends of said shoe means.

9. Apparatus in accordance with claim 8 wherein the shoe means are mounted on the cage means in a manner to move radially toward and away from the axis of said cage means at a third point intermediate the ends of said shoe means.

10. Apparatus in accordance with claim 1 wherein at least three elongated second shoe means are longitudinally and fixedly mounted in the first half of the cage means at spaced points about the interior of said first half of said cage means and are adapted to bear against the first section of the sections of pipe and rigidly hold said first section of pipe when said cage means is closed and latched.

11. Apparatus in accordance with claim 10 wherein closure piston means is mounted on one of the complementary portions of the closure means and is adapted to expand and contract the cage means when said caged means is closed and latched and said closure piston means is operated.

12. Apparatus in accordance with claim 10 wherein the closure piston means is a double-acting piston means.

13. Apparatus in accordance with claim 10 wherein the piston means mounted on the second half of the cage means are double-acting piston means.

14. Apparatus in accordance with claim 10 wherein the first and second halves of the caged means are longitudinally spaced from one another to provide an open area therebetween for access to the area where the ends of the two sections of pipe are to be aligned.

15. Apparatus in accordance with claim 10 wherein the first shoe means is generally arcuate, to generally conform to the curvature of the second section of pipe.

16. Apparatus in accordance with claim 10 wherein the second shoe means are generally arcuate, to generally conform to the curvature of the second section of pipe.

17. Apparatus in accordance with claim 10 wherein the first shoe means are pivotally coupled to the free ends of the piston rods of a pair of the piston means to pivot on an axis transverse to the axis of said first shoe means.

18. Apparatus in accordance with claim 10 wherein the first shoe means are coupled to the cage means in a manner to move radially toward and away from the axis of the cage means at at least two points, two of said points being adjacent the ends of said first shoe means.

19. Apparatus in accordance with claim 18 wherein the first shoe means are coupled to the cage means in a manner to move radially toward and away from the axis of said cage means at a third point intermediate the ends of said first shoe means.

* * * * *